Dec. 17, 1935.　　　　A. URFER　　　　2,024,314
ALTIMETER
Filed April 6, 1932　　　3 Sheets-Sheet 1

INVENTOR.
ADOLF URFER
BY
Stephen Cerstvik
ATTORNEY

Dec. 17, 1935.     A. URFER     2,024,314
ALTIMETER
Filed April 6, 1932     3 Sheets-Sheet 2
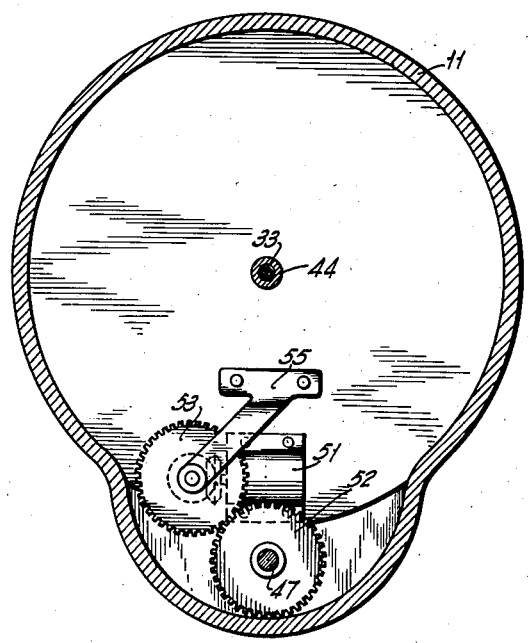
INVENTOR.
ADOLF URFER
BY Stephen Gerstvik
ATTORNEY Dec. 17, 1935.    A. URFER    2,024,314
ALTIMETER
Filed April 6, 1932    3 Sheets-Sheet 3

INVENTOR.
ADOLF URFER
BY Stephen Cerstvik
ATTORNEY

Patented Dec. 17, 1935

2,024,314

UNITED STATES PATENT OFFICE 2,024,314

ALTIMETER

Adolf Urfer, Richmond Hill, N. Y., assignor to Bendix Aviation Corporation, South Bend, Ind., a corporation of Delaware Application April 6, 1932, Serial No. 603,649

5 Claims. (Cl. 73—4)

The present invention relates to indicating instruments, and more particularly to sensitive instruments for indicating the altitude of an aircraft.

In devices of the above type, it is desirable that they be capable of adjustment under one condition for a second and predetermined condition and so that they will indicate when said predetermined condition occurs or is reached.

One of the objects of the present invention is to provide a novel indicating mechanism of the above character.

Another object of the invention is to provide, in an altimeter construction, a novel arrangement of parts whereby the instrument may be initially set to a desired condition and that condition definitely indicated irrespective of varying atmospheric pressures to which the instrument may thereafter be subjected.

Still another object is to provide, in an altimeter, a novel construction embodying an indicator which may be rotated for setting, together with a registering reference means coordinated with the indicator for the purpose of definitely indicating in numbers the amount of the initial setting of the altimeter.

A further object is to provide a novel and compact arrangement of parts whereby an unusually efficient and light-weight structure is obtained and one which may be readily and quickly set for any predetermined initial condition.

The above and other objects of the invention will appear more fully hereinafter from the following detailed description when taken in connection with the accompanying drawings. It is to be expressly understood, however, that the drawings are for the purpose of illustration only and are not designed as a definition of the limits of the invention, reference being had for this purpose to the appended claims.

In the drawings, wherein similar reference characters refer to similar parts throughout the several views:

Fig. 3 is a transverse sectional view taken on line 3—3 of Fig. 1;

Fig. 4 is a transverse sectional view taken on line 4—4 of Fig. 1;

Figure 1:
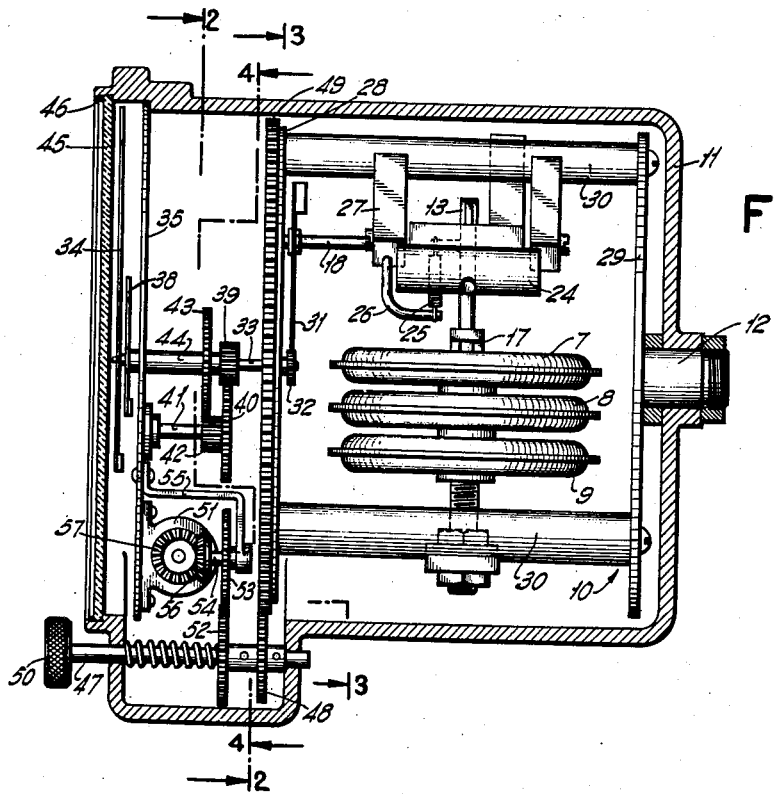
Fig. 1 is a longitudinal section of an altimeter constructed in accordance with the present invention.
Figure 2:
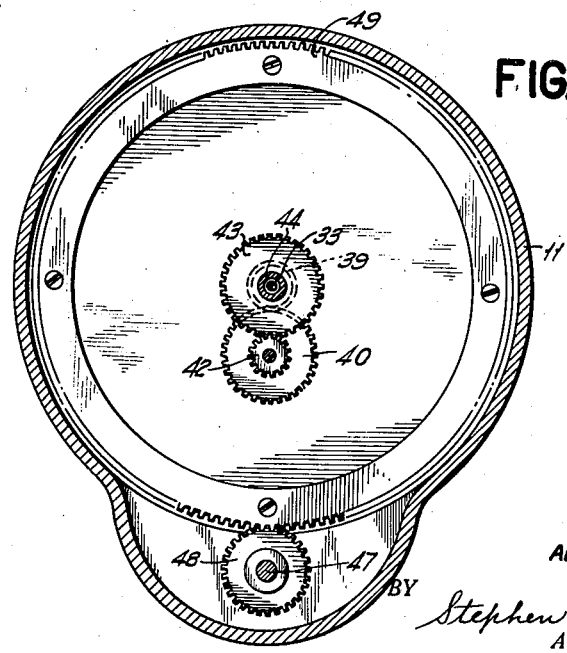
Fig. 2 is a transverse sectional view taken on line 2—2 of Fig. 1.

Referring to the drawings, and more particularly to Figs. 1 to 4, an instrument embodying the present invention is illustrated therein in the form of an altimeter having an evacuated pressure sensitive element which is adapted to contract and expand in accordance with variations in atmospheric pressure due to changes in altitude. The altimeter also includes an amplification mechanism for multiplying the relatively small movements of the pressure sensitive element into readily discernible movements of a plurality of pointers associated with suitable scales which may indicate the altitude in feet, meters or in terms of barometric pressure if desired, the pointers being preferably so interconnected that one goes only a fraction of a revolution for one complete revolution of the other, the latter indicating the altitude in hundreds of feet while the former indicates altitude in thousands of feet, for example.

In the form shown, the pressure sensitive element comprises one or more aneroid capsules such as, for example, 7, 8 and 9 carried by a supporting member 10 rotatably mounted in a housing 11 as by stub shaft 12 for a purpose which will appear more fully hereinafter. Means are provided for amplifying the movements of the aneroid capsules upon actuation thereof in accordance with changes in pressure to produce indications which, as heretofore stated, may be indicated in any suitable terms. As shown, said means comprises a pair of links 13 and 14 pivotally connected at 15, Fig. 3, the link 13 being connected to the aneroid capsule 7 through a temperature compensating element 16 and a bracket 17. The link 14 is rigidly connected to a rock shaft 18 journaled in a member 19 for rocking movement upon actuation of the aneroid capsules 7, 8 and 9. The bracket 17 is also connected to a pair of links 20 and 21 which are pivoted together at 22, the link 21 being in turn pivoted at 23. A counterweight 24 is carried by the link 21, and a spring 25 is also connected to the said link and to a member 26 secured to or formed integral with a supported member 27 so that the entire elastic system is balanced in order to prevent movement thereof due to vibrations, acceleration forces, etc. In other words, the rock shaft 18 is actuated only by the capsules 7, 8 and 9 to links 13 and 14 and not by any undesirable and/or extraneous forces. The rock shaft 18 is also journaled in a plate 28 which is secured to a plate 29, forming, together with spacing bars 30, the supporting member 10.

Figure 5:
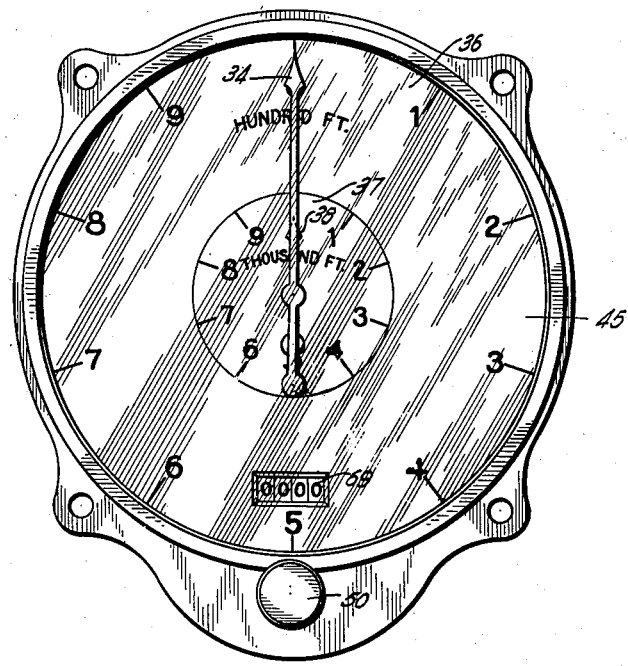
Fig. 5 is a front view of the altimeter showing the pointers and reference means at zero position.

The rock shaft 18 has secured thereto, or formed integral therewith, a gear sector 31 which is arranged to mesh with a pinion 32, the latter being carried by a shaft 33, having a large pointer 34 rigidly secured to the outer end thereof. The pointer 34 traverses the dial 35 which is secured to the housing 11 in any suitable manner and upon which is suitably engraved or marked a scale 36, Figs. 5 and 6, said scale being marked in hundreds of feet, for example. Concentric with the scale 36 is another scale 37 which is preferably graduated in thousands of feet and has cooperating therewith a small pointer 38. In order that the pointer 38 shall move with respect to its scale 37 and with the pointer 34 in the ratio existing between scales 36 and 37, the pointers are geared together in such a manner that the pointer 38 moves only a fraction of a resolution for one complete revolution of pointer 34, and for this purpose another gear 39 is secured to the shaft 33 and is adapted to mesh with a slightly larger gear 40 carried by shaft 41 suitably rotatably mounted in the dial 35. Shaft 41 also carries a pinion 42 which is adapted to mesh with a gear 43 fixedly secured to a sleeve 44 surrounding shaft 33 but rotatable with respect thereto, the left-hand end of said sleeve, as viewed in Fig. 1, extending through dial 35 and having the pointer 38 secured thereto.

A suitable cover glass 45 is secured to the open end of the casing 11 in any suitable manner as by means of a clamping ring 46, in order to protect the parts from dust, etc., and at the same time permitting the scale to be readily observed.

It will be apparent from the above that, as the aneroid capsules 7, 8 and 9 are actuated by barometric pressure, the rock shaft 18 is actuated through the links 13, 14 to effect movement of the motion amplification mechanism comprising the gear sector 31, thereby operating the pointers 34 and 38 in the proper ratio through the gear trains associated therewith. It will also be apparent that the pointers 34 and 38 will indicate the altitude with respect to barometric pressure or sea level and not the true altitude with respect to the ground; that is, the pointers would indicate zero only when the instrument is at sea level under normal conditions.

It will be highly desirable, under certain conditions, to render the instrument capable of adjustment under one condition for a second condition and to indicate when such second condition occurs. To this end, means are provided for making such an adjustment to effect an initial setting of the instrument, and such means are preferably so constituted as to cause a relative movement between the pointers and the respective scales in such a manner that the pointers will indicate zero when the instrument reaches the altitude for which it was set. In the form shown, such means comprises an adjusting or actuating shaft 47 having a gear 48 rigidly secured thereto, which is adapted to mesh with a relatively large gear 49 secured to the plate 28 of the rotatably mounted supporting structure 10 in any suitable manner. From this construction, it will be readily observed that, upon actuation of the shaft 47, as by means of a knob 50, the cooperation between gears 48 and 49 will effect a rotation of the support, aneroid capsules 7, 8 and 9, and amplification means comprising gear sector 31 with respect to the housing 11, it being also pointed out that, during such rotation of the above-described mechanism, the shaft 33 and pointer 34 will be bodily rotated with the support as a unit. Since, as above pointed out, the pinion 39 is fixedly secured to shaft 33, the pointer 38 will, during the above-described rotation of the support, be rotated in predetermined ratio with respect to its scale through pinion 39 and gear train 30, 42 and 43.

Figure 6:
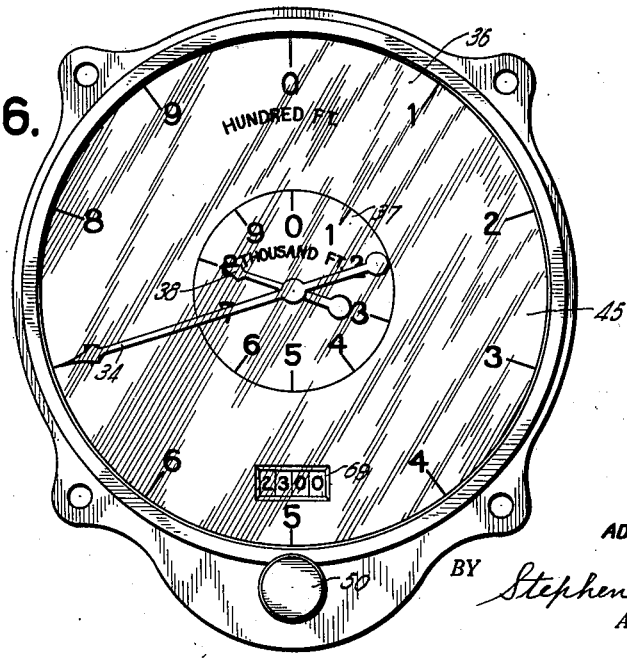
Fig. 6 is a view similar to Fig. 5 but illustrating the position of the pointers after an initial setting of twenty-three hundred (2300) feet has been made.

It is highly desirable, when initially setting the instrument, as above described, to positively indicate in numbers, at the time the setting is made, the amount of the setting so that such indication may serve as a rough reference point. In other words, if it is desired to set the pointers so that they will indicate zero when a certain altitude is reached, it is essential that such condition be indicated at the time the setting is being made, such indication being preferably in numbers whereby interpolation of a scale reading is rendered unnecessary. To this end, means are provided, whereby the indication of the desired condition for which the instrument is set is produced simultaneously with the rotation of the supporting mechanism and the aneroid capsules to cause relative movement between the pointers and their scales. In the form shown, such means comprises a suitable registering or counting mechanism such as a counter 51, carried by the dial 35 and arranged in such a manner that the number-carrying dials thereof are visible through the opening 69, Fig. 6, provided in the dial 38 at any convenient point, as for example, just below the scale 37.

The number-carrying dials of the counter which, in the present instance, are marked in feet, are actuated simultaneously with the setting of the pointers by means of the knob 50, as by means of a gear 52 secured to shaft 47 and adapted to mesh with gear 53 secured to a stub shaft 54 mounted on a bracket 55 carried by the dial 35. The stub shaft 54 also carries a suitable bevel gear 56 adapted to actuate the counter through a corresponding bevel gear 57.

It will readily be appreciated from the foregoing that, when the knob 50 is actuated to adjust the instrument for a desired condition, relative movement is caused between the pointers and the respective scales through their respective gear trains by reason of the rotation of the amplification mechanism and aneroid capsules 7, 8 and 9, carried by the support 10. Simultaneously with the rotation of the support, the shaft 47 also actuates the reference means or counter 51 to positively indicate, independently of the scales, the condition for which the instrument has been set.

There is thus provided by the present invention a novel indicating device which may be set under one condition for a second condition so that it will indicate when the second condition occurs or is reached, and also indicates the condition for which it has been set independently of the indicating action of the device.

Although only one embodiment of the invention has been illustrated and described, it will be readily understood by those skilled in the art that changes may be made therein without departing from the scope of the invention. Reference will, therefore, be had to the appended claims for a definition of the limits of the invention.

What is claimed is:

1. In a sensitive altimeter, a housing, a support rotatably mounted in the housing, means including a pressure sensitive capsule carried by said support, pointers operatively connected to said capsule, a dial for said pointers associated with said housing and having a plurality of scales, a counter secured to said dial, and common means for angularly moving said support and setting said counter and pointers.

2. In an altimeter, a housing, a support rotatably mounted in said housing, means including a pressure sensitive capsule carried by said support, a plurality of pointers connected to said capsule, a dial for said pointers associated with said housing, a counter secured to said dial and having a plurality of interconnected numbering elements each provided with a set of numerals and movable to select for exhibition a single numeral from each set, said selected numerals constituting a figure representing altitude or barometric pressure, and common means for angularly moving said support to set the pointers and for simultaneously setting the numbering elements of said counter.

3. In an altimeter, a housing, a support rotatably mounted in said housing, means including a pressure sensitive capsule carried by said support, pointer means connected to said capsule, a dial for said pointer means associated with said housing, a counter secured to said dial and having a plurality of interconnected numbering elements each provided with a set of numerals and movable to select for exhibition a single numeral from each set, said selected numerals constituting a figure representing altitude or barometric pressure, and means for angularly moving said support to set the pointer means and for simultaneously setting the numbering elements of said counter.

4. In an indicating instrument, a housing, a support rotatably mounted in said housing, means including an actuating device carried by said support, a plurality of pointers connected to said actuating device, a dial for said pointers associated with said housing, a counter secured to said dial and having a plurality of interconnected numbering elements each provided with a set of numerals and movable to select for exhibition a single numeral from each set, said selected numerals constituting a figure representing a predetermined condition for which it is desired to set the pointers, and common means for angularly moving said support to set the pointers and for simultaneously setting the numbering elements of said counter.

5. In an indicating instrument, a housing, a support rotatably mounted in said housing, means including an actuating device carried by said support, pointer means connected to said actuating device, a dial for said pointer means associated with said housing, a counter secured to said dial and having a plurality of interconnected numbering elements each provided with a set of numerals and movable to select for exhibition a single numeral from each set, said selected numerals constituting a figure representing a predetermined condition for which it is desired to set the pointer means, and common means for angularly moving said support to set the pointer means and for simultaneously setting the numbering elements of said counter.

ADOLF URFER.